(12) United States Patent
Lee et al.

(10) Patent No.: US 11,774,640 B2
(45) Date of Patent: Oct. 3, 2023

(54) VEHICLE CAMERA HAVING HIGH GLASS TRANSITION TEMPERATURE LENS

(71) Applicant: HYUNDAI MOBIS CO., LTD., Seoul (KR)

(72) Inventors: Tae Youn Lee, Suwon-si (KR); Sang Hwan Oh, Yongin-si (KR); Eun Ho Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 480 days.

(21) Appl. No.: 17/029,481

(22) Filed: Sep. 23, 2020

(65) Prior Publication Data

US 2021/0382207 A1    Dec. 9, 2021

(30) Foreign Application Priority Data

Jun. 5, 2020 (KR) .................... 10-2020-0068187

(51) Int. Cl.
*B60R 1/00*    (2022.01)
*B60R 1/12*    (2006.01)
(Continued)

(52) U.S. Cl.
CPC ............... *G02B 1/18* (2015.01); *B60R 11/04* (2013.01); *G02B 5/208* (2013.01); *G02B 9/60* (2013.01);
(Continued)

(58) Field of Classification Search
CPC . B60R 1/006; B60R 2001/1253; B60R 11/04; B60R 2011/004; B60R 2300/108;
(Continued)

(56) References Cited

U.S. PATENT DOCUMENTS 4,792,211 A * 12/1988 Harada .................. G02F 1/141
                                                              349/162
7,079,328 B2    7/2006 Kuba
(Continued)

FOREIGN PATENT DOCUMENTS

JP    2006227322 A    8/2006
JP       4508525 B2    7/2010
(Continued)

OTHER PUBLICATIONS

Korean office action dated Jul. 16, 2021 issued in corresponding Korean Application 10-2020-0068187.

*Primary Examiner* — Ryan S Dunning
(74) *Attorney, Agent, or Firm* — NovoTechIP International PLLC

(57) ABSTRACT

A vehicle camera is disclosed. A vehicle camera according to at least one embodiment includes a water-repellent coating layer configured to allow a contact angle of water droplets to be formed at at least a predetermined angle, a reflective member having a reflective surface configured to change an optical path, a lens group including at least one or more lenses that have high heat resistance and a glass transition temperature of 140° C. or higher, and an optical filter group including at least one or more optical filters, wherein the water-repellent coating layer, the reflective member, the lens group, and the optical filter group are arranged in order of appearance from an object side along an optical axis.

17 Claims, 12 Drawing Sheets

(51) Int. Cl.
| | |
|---|---|
| *B60R 11/00* | (2006.01) |
| *B60R 11/04* | (2006.01) |
| *G02B 1/14* | (2015.01) |
| *G02B 1/18* | (2015.01) |
| *G02B 13/00* | (2006.01) |
| *G02B 5/08* | (2006.01) |
| *G02B 5/20* | (2006.01) |
| *G02B 7/00* | (2021.01) |
| *G02B 9/60* | (2006.01) |
| *G03B 11/00* | (2021.01) |
| *G03B 17/08* | (2021.01) |
| *G03B 17/12* | (2021.01) |
| *G03B 30/00* | (2021.01) |

(52) U.S. Cl.
CPC .............. *G03B 17/08* (2013.01); *B60R 1/006* (2013.01); *B60R 2001/1253* (2013.01); *B60R 2011/004* (2013.01); *B60R 2300/108* (2013.01)

(58) Field of Classification Search
CPC ... G02B 1/14; G02B 1/18; G02B 5/08; G02B 5/208; G02B 7/007; G02B 9/60; G02B 13/0015; G02B 13/0045; G02B 13/0065; G03B 11/00; G03B 17/08; G03B 17/12; G03B 30/00; G03B 2217/002
See application file for complete search history.

(56) References Cited

U.S. PATENT DOCUMENTS

| | | | |
|---|---|---|---|
| 7,292,281 | B2 | 11/2007 | Cheng |
| 2006/0046065 | A1* | 3/2006 | Suzuki ............... C08G 64/1608 528/196 |
| 2013/0016433 | A1 | 1/2013 | Ozaki et al. |
| 2015/0192703 | A1* | 7/2015 | Shim ...................... G02B 1/118 359/601 |

FOREIGN PATENT DOCUMENTS

| | | |
|---|---|---|
| JP | 5621782 B2 | 11/2014 |
| JP | 2018062327 A1 | 7/2019 |
| KR | 20120003036 A | 1/2012 |
| KR | 10-2013-0119772 A | 11/2013 |
| KR | 20180076894 A | 7/2018 |
| KR | 20180077609 A | 7/2018 |

\* cited by examiner (a)

(b)

| Surface No. | Curvature Radius | Thickness, Space | Focal Length | Index of Refraction(nd) | Abbe No. (vd) | Glass Transition Point(Tg) |
|---|---|---|---|---|---|---|
| object | infinity | infinity | | | | |
| 1 | infinity | 1.9 | | 1.8147 | 44.24 | |
| 2 | infinity | 1.9 | | 1.8147 | 44.24 | |
| 3 | infinity | 1 | | | | |
| 4* | 2.29 | 1.237 | 4.4791 | 1.5116 | 56.3 | 164°C |
| 5* | 380.364 | 0.05 | | | | |
| 6* | 6.852 | 0.33 | -7.1855 | 1.64 | 23.5 | 145°C |
| 7* | 2.716 | 0.65 | | | | |
| 8* | 7.967 | 0.7 | -72.5608 | 1.5116 | 56.3 | 164°C |
| 9* | 6.368 | 1.124 | | | | |
| 10* | -7.089 | 0.7 | 14.4951 | 1.64 | 23.5 | 145°C |
| 11* | -4.192 | 0.15 | | | | |
| 12* | -4.668 | 0.558 | -8.6557 | 1.535 | 55.71 | 143°C |
| 13* | 1335.59165 | 2.48 | | | | |
| 14 | infinity | 0.4 | | 1.5168 | 64.2 | |
| 15 | infinity | 0.5 | | | | |
| 16 | infinity | 0.4 | | 1.5168 | 64.2 | |
| 17 | infinity | 0 | | | | |
| 18 | infinity | 0.423 | | | | |
| img | infinity | 0 | | | | |

*FIG. 3*

| Surface No. | K | A | B | C | D | E |
|---|---|---|---|---|---|---|
| 4 | -1.00000 | 9.01183E-03 | 1.07038E-04 | 2.05676E-04 | -1.55597E-04 | |
| 5 | 0.00000 | 3.53188E-03 | -1.52220E-03 | 8.38612E-05 | 1.34422E-04 | -3.53827E-05 |
| 6 | 0.00000 | -4.73241E-03 | 7.08679E-03 | 4.33084E-04 | -2.65526E-06 | |
| 7 | 0.02820 | 2.72523E-04 | 1.42260E-02 | 4.14341E-03 | -2.53698E-04 | 5.66312E-04 |
| 8 | 0.00000 | 1.25963E-02 | 8.28664E-03 | 3.59255E-03 | -3.36634E-04 | 3.72086E-05 |
| 9 | 9.72256 | 8.44297E-04 | 5.34215E-03 | 1.53692E-03 | -3.78203E-04 | 2.11008E-04 |
| 10 | 24.58332 | -2.72966E-02 | -4.49962E-03 | -1.44941E-03 | 2.59695E-04 | -1.09649E-04 |
| 11 | 0.00000 | -1.48150E-02 | -6.14612E-03 | -1.19375E-04 | 3.06982E-04 | |
| 12 | 0.00000 | -2.03514E-02 | -2.11031E-03 | 1.40770E-03 | -4.52142E-04 | 1.50552E-04 |
| 13 | 0.00000 | -2.80822E-02 | 3.21114E-03 | -2.28156E-04 | -1.31278E-04 | 2.37397E-05 |

*FIG. 4*

| Surface No. | Curvature Radius | Thickness, Space | Focal Length | Index of Refraction(nd) | Abbe No. (vd) | Glass Transition Point(Tg) |
|---|---|---|---|---|---|---|
| object | infinity | infinity | | | | |
| 1 | infinity | 1.9 | | 1.8147 | 44.24 | |
| 2 | infinity | 1.9 | | 1.8147 | 44.24 | |
| 3 | infinity | 1 | | | | |
| 4* | 2.868 | 1.247 | 5.9241 | 1.5116 | 56.3 | 164°C |
| 5* | 42.327 | 0.03 | | | | |
| 6* | 4.653 | 0.8 | -8.9968 | 1.64 | 23.5 | 145°C |
| 7* | 2.411 | 0.3 | | | | |
| 8(stp)* | 5.769 | 0.34 | -12.7335 | 1.614 | 26 | 156°C |
| 9* | 3.258 | 1.204 | | | | |
| 10* | -3.968 | 0.6 | 35.5959 | 1.64 | 23.5 | 145°C |
| 11* | -3.585 | 0.148 | | | | |
| 12* | 6.552 | 0.8 | 27.8298 | 1.5116 | 56.3 | 164°C |
| 13* | 11.594 | 4.785 | | | | |
| 14 | infinity | 0.4 | | 1.5168 | 64.2 | |
| 15 | infinity | 0.5 | | | | |
| 16 | infinity | 0.4 | | 1.5168 | 64.2 | |
| 17 | infinity | 0.516 | | | | |
| 18 | infinity | 0.139 | | | | |
| img | infinity | -0.01 | | | | |

*FIG. 7*

| Surface No. | K | A | B | C | D | E |
|---|---|---|---|---|---|---|
| 4 | -0.56910 | 2.71168E-03 | -3.13070E-04 | 1.24980E-04 | -4.76530E-05 | |
| 5 | 0.00000 | 3.02441E-03 | -1.90409E-03 | 1.57219E-04 | -3.73698E-06 | 9.33693E-07 |
| 6 | 0.00000 | -5.78260E-03 | 1.27628E-03 | -3.94088E-04 | 1.17363E-04 | |
| 7 | 0.00000 | -1.88564E-02 | 8.12823E-03 | 3.44053E-04 | -1.02514E-05 | 5.66312E-04 |
| 8 | 0.00000 | -3.90764E-04 | 8.19534E-03 | -9.82893E-04 | 1.61011E-03 | 3.72086E-05 |
| 9 | 0.00000 | 1.52182E-02 | 4.63032E-03 | -4.84157E-04 | 9.13266E-04 | 9.18340E-05 |
| 10 | 0.00000 | 2.10232E-02 | -1.13907E-02 | 4.18892E-03 | -1.28688E-03 | 3.03768E-04 |
| 11 | -4.09209 | -4.07148E-04 | -2.83313E-03 | 1.12250E-03 | -2.21470E-04 | 4.35704E-05 |
| 12 | -5.91711 | -2.25409E-02 | 6.27828E-03 | -6.37090E-04 | 1.14107E-04 | -1.00652E-05 |
| 13 | -99.00000 | -1.65430E-02 | 2.11658E-03 | -6.98753E-05 | 1.31001E-06 | 5.59702E-06 |

*FIG. 8*

| Item | Embodiment 1 | Embodiment 2 | Conditional Expression |
|---|---|---|---|
| TTL (Total Track Length) | 9.702 | 12.199 | |
| BFL (Back Focal Length) | 4.203 | 6.73 | |
| TTL/BFL | 2.308351178 | 1.812630015 | 1.0 < TTL/BFL < 3.5 |
| Overall Focal Length of Optical System (f) | 10.6 | 12 | |
| First Lens Focal Length (f1) | 4.4791 | 5.9241 | |
| f/f1 | 2.366546851 | 2.025624145 | 1.5 < f/f1 < 3.5 |
| MAX (Tg Value of High Heat Resistance Lens) | 164°C | 164°C | ≥152°C |
| MIN (Tg Value of High Heat Resistance Lens) | 143°C | 145°C | ≥140°C |
| P(nd) (Refractive Index of Plastic Lens) | 1.5116 | 1.5116 | 1.5 < P(nd) < 1.54 |
| θ (Contact Angle) | ≥110° | ≥110° | ≥100° |
| D (Thickness of O-ring Or Gasket) | 1 | 1 | |
| δ (Depressed Amount of O-ring Or Gasket) | 0.23 | 0.23 | |
| K (Compression Ratio) | 23% | 23% | 10% < K < 30% |

*FIG. 12*

VEHICLE CAMERA HAVING HIGH GLASS TRANSITION TEMPERATURE LENS

CROSS-REFERENCE TO RELATED APPLICATIONS

The present application is based on, and claims priority from, Korean Patent Application Number 10-2020-0068187, filed Jun. 5, 2020, the disclosure of which is incorporated by reference herein in its entirety.

TECHNICAL FIELD

The present disclosure in some embodiments relates to a vehicle camera. More particularly, the present disclosure relates to a vehicle camera to which a water-repellent coating and a waterproof structure are applied while using a lens of high heat resistant material.

BACKGROUND

The statements in this section merely provide background information related to the present disclosure and do not necessarily constitute prior art.

For vehicle cameras, a wide-angle lens or a fish-eye lens is used to obtain a wide angle of view as with a telephoto lens which is also used to recognize an image at a distance. As such, the camera mounted on the vehicle generates heat through continuous use, which necessitates the use of a lens made of a high heat resistant material.

A relevant prior art includes DE 10-2018-202205 disclosing 'Telephoto camera for a vehicle and the vehicle mounting a telecamera' among others.

However, these prior art endeavors are centered around the structure of a vehicle camera using a telephoto lens, do not address the issue of the telephoto lens about increasing the overall length thereof, and fail to resolve weakness in heat resistance for securing the required camera performance.

Employing a lens of a high heat resistant material alone cannot stop the optical performance from being deteriorated due to a low refractive index of the very lens of the high heat resistant material, and most of the prior art arrangements do not employ a water-repellent coating and a waterproof structure, disabling the camera from securing visibility in bad weather.

SUMMARY

According to at least one embodiment, the present disclosure provides a vehicle camera including a water-repellent coating layer configured to allow a contact angle of water droplets to be formed at least a predetermined angle, a reflective member having a reflective surface configured to change an optical path, a lens group including at least one or more lenses that have high heat resistance and a glass transition temperature of 140° C. or higher, and an optical filter group including at least one or more optical filters. Here, the water-repellent coating layer, the reflective member, the lens group, and the optical filter group are arranged in order of appearance from an object side along an optical axis.

The lens group may include a lens that is disposed closest to the reflective member, has a positive refractive power, has an object-side surface that is convex, and has a glass transition temperature of 152° C. or higher.

The vehicle camera may satisfy $1.0<TTL/BFL<3.5$ where TTL represents a total track length that is a distance to an image surface of the vehicle camera from the object-side surface of the lens that is disposed closest to the reflective member among the lenses of the lens group, and BFL represents a back focal length that is a distance to the image surface from an image-side surface of a lens that is disposed closest to the image surface among the lenses of the lens group.

The vehicle camera may satisfy $1.5<f/f1<3.5$ where f represents a total focal length of an optical system composed of the lens group, and f1 represents a focal length of the lens that is disposed closest to the reflective member.

The lens group may include a first lens having positive refractive power, a second lens having negative refractive power, a third lens having negative refractive power, a fourth lens having positive refractive power, and a fifth lens having negative refractive power. Here, the first lens, the second lens, the third lens, the fourth lens, and the fifth lens may be arranged in order of appearance from the object side along the optical axis.

The first lens and the third lens may have a glass transition temperature of 152° C. or higher.

Meanwhile, the lens group may include a first lens having positive refractive power, a second lens having negative refractive power, a third lens having negative refractive power, a fourth lens having positive refractive power, and a fifth lens having positive refractive power. Here, the first lens, the second lens, the third lens, the fourth lens, and the fifth lens may be arranged in order of appearance from the object side along the optical axis.

Here, the first lens, the third lens, and the fifth lens may have a glass transition temperature of 152° C. or higher.

The water-repellent coating layer may be configured to allow at least 100° of contact angle of water droplets to be formed.

The water-repellent coating layer may be formed by a coating process performed on an object-side surface of the reflective member.

The vehicle camera may further include a lens cover disposed between the water-repellent coating layer and the reflective member to protect the reflective member, wherein the water-repellent coating layer is formed by a coating process performed on a front surface of the lens cover.

The lens cover may have a rear surface on which an infrared coating layer is formed.

The optical filter group may include an infrared (IR) filter, and a coverglass configured to protect an image surface of the vehicle camera, the IR filter and the coverglass being arranged in order of appearance from the object side.

The vehicle camera may include a front body configured to include the reflective member and the lens group, and it may include an object-side surface on which a groove is formed and a waterproof member that is disposed between the lens cover and the groove of the front body.

The waterproof member may be an O-ring or gasket and may satisfy $10\%<K<30\%$ where K represents a compression ratio of the O-ring or gasket.

At least one or more of the lenses included in the lens group may have a glass transition temperature of 152° C. or higher. The lens group may include at least one or more plastic lenses. At least one or more of the plastic lenses may satisfy $1.51<P(nd)<1.54$ where P(nd) represents an index of refraction of the plastic lenses.

Another embodiment of the present disclosure provides a vehicle equipped with the vehicle camera of claim 1, which is mounted on one or more of a front side, a rear side, an A-pillar, a B-pillar, a side mirror, and an electronic mirror (e-mirror) of the vehicle.

BRIEF DESCRIPTION OF THE DRAWINGS

FIG. 3 is a table showing the characteristics of respective lenses illustrated in FIG. 1.

FIG. 4 is a table showing aspheric coefficients of the respective lenses illustrated in FIG. 1.

FIG. 7 is a table showing characteristics of respective lenses illustrated in FIG. 6.

FIG. 8 a table showing aspheric coefficients of the respective lenses disclosed in FIG. 6.

FIG. 12 is a table showing the optical characteristics of the vehicle cameras according to the first and second embodiments of the present disclosure.

Figure 1:
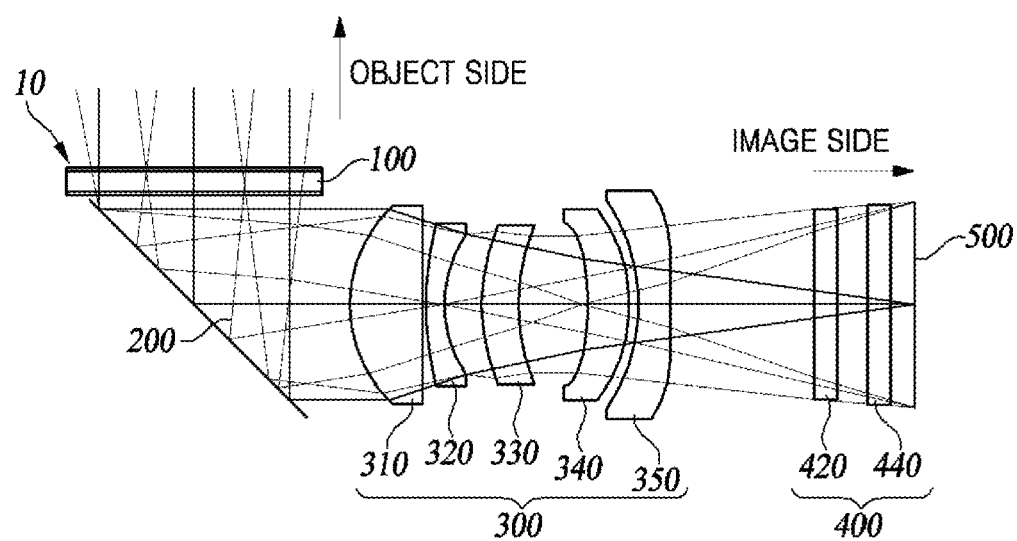
FIG. 1 is a diagram of an optical system of a vehicle camera according to a first embodiment of the present disclosure.

| REFERENCE NUMERALS | |
|---|---|
| 10: water-repellent coating layer | 20: IR coating layer |
| 100: lens cover | 200: reflective member |
| 220: prism | 240: mirror |
| 300: lens group | 310: first lens |
| 320: second lens | 330: third lens |
| 340: fourth lens | 350: fifth lens |
| 400: optical filter group | 420: IR filter |
| 440: cover glass | 500: image surface |
| 600: lens group | 610: first lens |
| 620: second lens | 630: third lens |
| 640: fourth lens | 650: fifth lens |
| 700: front body | 710: waterproof member |
| 720: retainer | 730: lens barrel |
| 740: PCB | 750: rear body |

DETAILED DESCRIPTION

At least one embodiment of the present disclosure seeks to resolve the above issues and to provide a vehicle camera having good optical performance while using a high heat resistance lens as well as reducing the length of the telephoto lens.

In addition, the present disclosure aims to provide a vehicle camera to which a water-repellent coating and a waterproof structure are applied.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric code such as first, second, i), ii), (a), (b), etc., in numbering components are used solely for the purpose of differentiating one component from the other but not to imply or suggest the substances, the order or sequence of the components. Throughout this specification, when a part "includes" or "comprises" a component, the part is meant to further include other components, not excluding thereof unless there is an explicit description contrary thereto.

FIG. 1 is a diagram of an optical system of a vehicle camera according to a first embodiment of the present disclosure.

Figure 2:
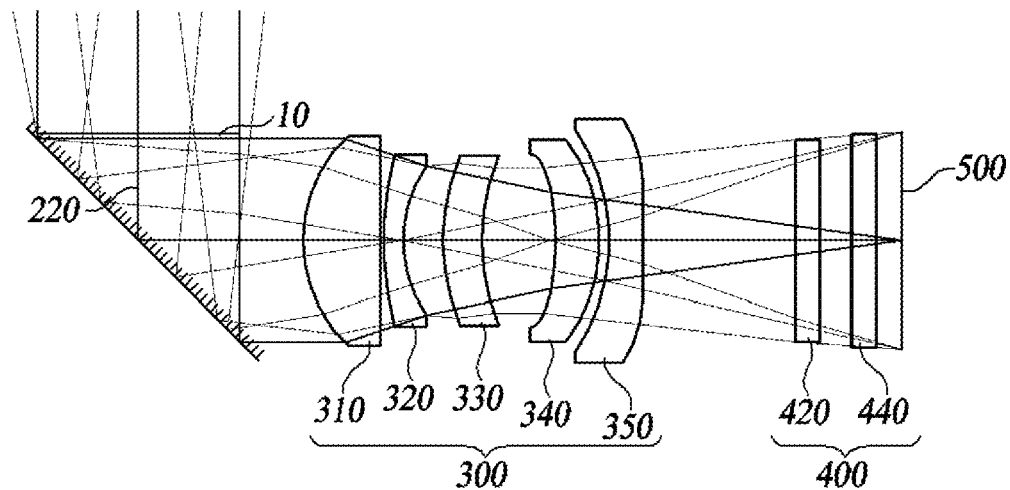
FIG. 2 shows diagrams of optical systems of a vehicle camera with a lens cover removed according to at least one embodiment of the present disclosure.
Figure 2:
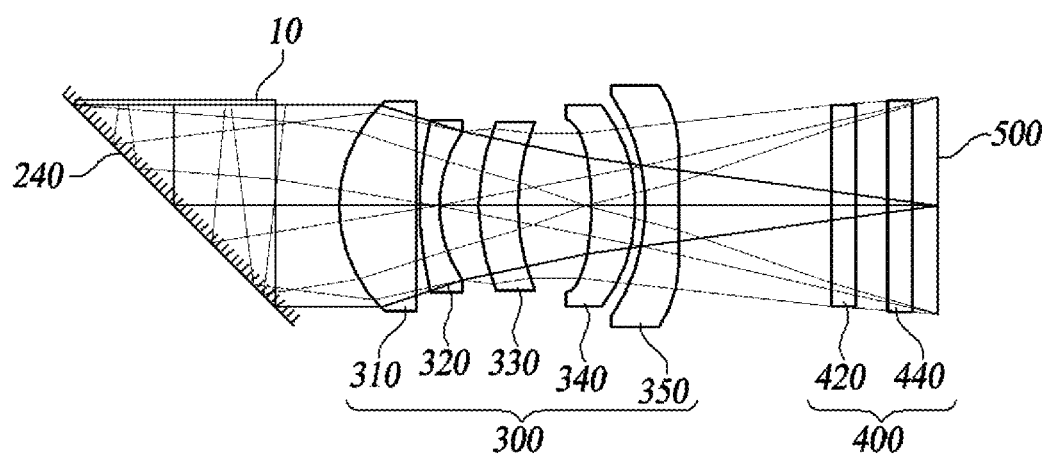

FIG. 2 shows diagrams of optical systems of a vehicle camera with a lens cover removed according to at least one embodiment of the present disclosure.

FIG. 2 illustrates (a) a reflective member 200 that is a prism 220, and illustrates (b) the reflective member 200 that is a mirror 240.

As shown in FIGS. 1 and 2, the vehicle camera according to at least one embodiment of the present disclosure includes all or some of a water-repellent coating layer 10, a lens cover 100, a reflective member 200, a lens group 300, an optical filter group 400, and an image surface 500.

The water-repellent coating layer 10 is disposed along the optical axis and is disposed at the closest distance from the object side. The water-repellent coating layer 10 may be located on the front surface of the lens cover 100, or in the absence of the lens cover 100, may be located on the object-side surface of the reflective member 200. This is to prevent water droplets from forming due to rain or the like on the surface of the vehicle camera as much as possible.

The water-repellent coating layer 10 forms a thin layer by using a fluorine-containing silane compound. This thin layer makes the surface of the object hydrophobic, preventing water droplets from easily forming on the surface. The performance of the water-repellent coating may be known by measuring the contact angle of the water droplets. The water-repellent coating layer 10 according to at least one embodiment of the present disclosure preferably causes the contact angle of the water droplets to be 100° or more. Obtaining the 100° or more contact angle of the water droplets can prevent the water droplets from continuously forming on the surface of the camera, and the water droplets can easily fall off the camera surface when driving.

Therefore, even when the vehicle is driving in bad weather conditions, the visibility of the camera is secured, so that the driver can safely secure the field of view by using the camera, and it can safely drive even in autonomous driving.

The lens cover 100 is disposed along the optical axis and located on the rear surface of the water-repellent coating layer 10 based on the object side and thereby serves to protect the reflective member 200 and the lens group 300. The lens cover 100 may be coupled to the front body 700 to firmly protect the reflective member 200 and the lens group 300. However, the vehicle camera according to at least one embodiment of the present disclosure may omit the lens cover 100. In that case, the front body 700 is preferably designed to protect the reflective member 200 and the lens group 300.

The reflective member 200 is disposed along the optical axis and is spaced a predetermined distance from the rear surface of the lens cover 100 based on the object side. However, at the absence of the lens cover 100, the reflective member 200 may be located on the back of the water-repellent coating layer 10 based on the object side, and where an infrared (IR) coating layer 20 is formed on the back of the water-repellent coating layer 10, the reflective member 200 may be located on the rear of the IR coating layer 20. The reflective member 200 is configured to change the light path by 90°, and it may be a prism 220 or a mirror 240. As described above, the length of the telephoto lens may be reduced by the reflective member 200 performing to change the optical axis.

The lens group 300 is disposed along the optical axis and is spaced a predetermined distance from the reflective member 200 in a direction away from the object side. The lens group 300 is configured to include at least one high heat resistance lens having a glass transition temperature of 140° C. or higher. Therefore, the lens group 300 may include at least one lens using a high heat resistant material which includes, but not limited to plastic, organic-inorganic hybrid materials, glass, and the like.

At least one or more of the lenses included in the lens group 300 equivalent to an aspherical lens. For example, the lens disposed closest to the object side or the image surface 500 may include an aspherical surface. Incorporating an aspherical lens can increase the resolution of the entire optical system and improve optical aberration. The aspherical surface may be expressed by Equation 1.

$$Z = \frac{cY^2}{1 + \sqrt{1 - (1+K)c^2Y^2}} + AY^4 + BY^6 + CY^8 + DY^{10} + EY^{12} + FY^{14} + \ldots \quad \text{Equation 1}$$

In Equation 1, c is the reciprocal of the radius of curvature of the lens, K is a conic constant, Y is the distance from any point on the aspherical surface of the lens to the optical axis, constants A to F denote aspheric coefficients, and Z represents the height from any point on the aspherical surface of the lens to the vertex of that aspherical surface.

FIGS. 1 and 2 illustrate the lens group 300 as including five lenses, although it is not necessarily limited to those five lenses. On the other hand, the thickness, size, and shape of the lenses in FIGS. 1, 2, and the following drawings are somewhat exaggerated for explanation, and in particular, the spherical or aspherical shape of the lens is presented as an example and is not necessarily limited to the illustrated shape. This is also the case in FIG. 6.

As shown in FIGS. 1 and 2, the lens group 300 includes five lenses disposed along the optical axis, which are a first lens 310, a second lens 320, a third lens 330, a fourth lens 340, and a fifth lens 350 arranged in order of appearance and order of closeness to the object side. Further, the plurality of lenses may be arranged spaced apart from each other by predetermined distances along the optical axis.

On the other hand, in the description of the shape of the lens below, one surface being convex means that the optical axis portion of that surface is convex, and one surface being concave means that the optical axis portion of that surface is concave. Therefore, even if one surface of the lens is described as being convex, the edge portion of the lens may be concave. Similarly, even if one surface of the lens is described as being concave, the edge portion of the lens may be convex.

The following is a description of the lens group 300 included in the vehicle camera according to the first embodiment.

The first lens 310 may have a positive refractive power and one surface that is convex, for example, on an object-side surface thereof. In this case, the first lens 310 may have an image-side surface that is a concave meniscus shape. Further, at least one of the object-side surface and the image-side surface of the first lens 310 may be an aspherical surface.

The second lens 320 may have a negative refractive power and one surface that is convex, for example, on an object-side surface thereof. In this case, the second lens 320 may have an image-side surface that is a concave meniscus shape. In addition, at least one of the object-side surface and the image-side surface of the second lens 320 may be an aspherical surface.

The third lens 330 may have a negative refractive power and one surface that is convex, for example, on an object-side surface thereof. In this case, the third lens 330 may have an image-side surface that is a concave meniscus shape. In addition, at least one of the object-side surface and the image-side surface of the third lens 330 may be an aspherical surface.

The fourth lens 340 may have a positive refractive power and one surface that is concave, for example, on an object-side surface thereof. In this case, the fourth lens 340 may have an image-side surface that is a convex meniscus shape. Further, at least one of the object-side surface and the image-side surface of the fourth lens 340 may be an aspherical surface.

The fifth lens 350 may have a negative refractive power and one surface that is concave, for example, on an object-side surface thereof. In this case, the fifth lens 350 may have an image-side surface that is a convex meniscus shape. In addition, at least one of the object-side surface and the image-side surface of the fifth lens 350 may be an aspherical surface.

The first lens 310 to the fifth lens 350 are preferably plastic lenses excellent in heat resistance so as not to be damaged by heat generated due to the continuous use of the camera, wherein the glass transition temperature of the respective lenses may be 140° C. or higher. However, they are not necessarily configured using lenses made of plastic, and as long as the glass transition temperature can be 140° C. or higher, lenses of other materials may also be employed.

In addition, the lens of high heat resistant material having a glass transition temperature of 152° C. or higher generally has a low refractive index, so an optical system composed only of lenses of high heat resistant material has poor aberration performance, and thus lenses of high heat resistant material are preferably arranged in a manner that does not degrade the aberration performance of the optical system.

Accordingly, to obtain performance equivalent to the aberration performance of a prevalent optical system, the first lens 310 may be the one that uses a high heat resistant material to have a glass transition temperature of 152° C. or higher. The third lens 330 may also be the one that uses a high heat resistant material to have a glass transition temperature of 152° C. or higher.

The optical filter group 400 is disposed along the optical axis and is spaced a predetermined distance from the lens group 300 in a direction away from the object side. The optical filter group 400 may include all or some of an infrared (IR) filter 420 and a coverglass 440 which may be arranged in order of appearance from the object side.

The IR filter 420 serves to block infrared rays, and it may be positioned at a predetermined distance from the fifth lens 350 at its side facing toward the image surface 500. However, the IR filter 420 may be omitted when the IR coating layer 20 is formed on the rear surface of the lens cover 100 or the IR coating layer 20 is formed on the object-side surface of the reflective member 200.

The cover glass 440 is positioned at a predetermined distance from the IR filter 420 in a direction away from the object side, and when the IR filter 420 is omitted, it may be positioned at a predetermined distance from the fifth lens 350.

The image surface 500 is disposed along the optical axis and is spaced a predetermined distance from the optical filter group 400 in a direction away from the object side. An image of an object is formed on the image surface 500.

FIG. 3 is a table showing characteristics of the respective lenses illustrated in FIG. 1.

FIG. 4 is a table showing aspheric coefficients of the respective lenses illustrated in FIG. 1.

In FIGS. 3 and 4, the values for the radius of curvature, thickness, focal length, etc. of the lenses are all in mm, and the unit of glass transition temperature is ° C.

FIGS. 3 and 4 specify the curvature radius, thickness, focal length, index of refraction, Abbe number, glass transition temperature, and asphericity of the reflective member 200, the lens group 300, the IR filter 420, and the cover glass 440 according to the first embodiment.

The focal length (f) of the entire optical system according to the first embodiment is 10.6 mm, and the focal length (f1) of the first lens 310 is 4.4791 mm. On the other hand, a total track length (TTL) refers to the distance to the image surface 500 from the object-side surface of the lens disposed closest to the reflective member 200 among the lenses of the lens group 300, and a back focal length (BFL) refers to the distance to the image surface 500 from an image-side surface of the lens disposed closest to the image surface 500.

The entire optical system according to the first embodiment may satisfy conditional expression 1 and conditional expression 2.

$$1.0 < TTL/BFL < 3.5 \quad \text{[Conditional Expression 1]}$$

$$1.5 < f/f1 < 3.5 \quad \text{[Conditional Expression 2]}$$

Meanwhile, the lens group 300 according to the first embodiment may include at least one or more plastic lenses. When the glass transition temperature of the lens is Tg and the refractive index for the plastic material of the lens is P(nd), at least one or more of the lenses included in the lens group 300 according to the first embodiment can satisfy conditional expression 3, and at least one or more plastic lenses among the lenses included in the lens group 300 according to the first embodiment can satisfy conditional expression 4.

$$Tg > 152° \text{ C.} \quad \text{[Conditional Expression 3]}$$

$$1.51 < P(nd) < 1.54 \quad \text{[Conditional Expression 4]}$$

Figure 5:
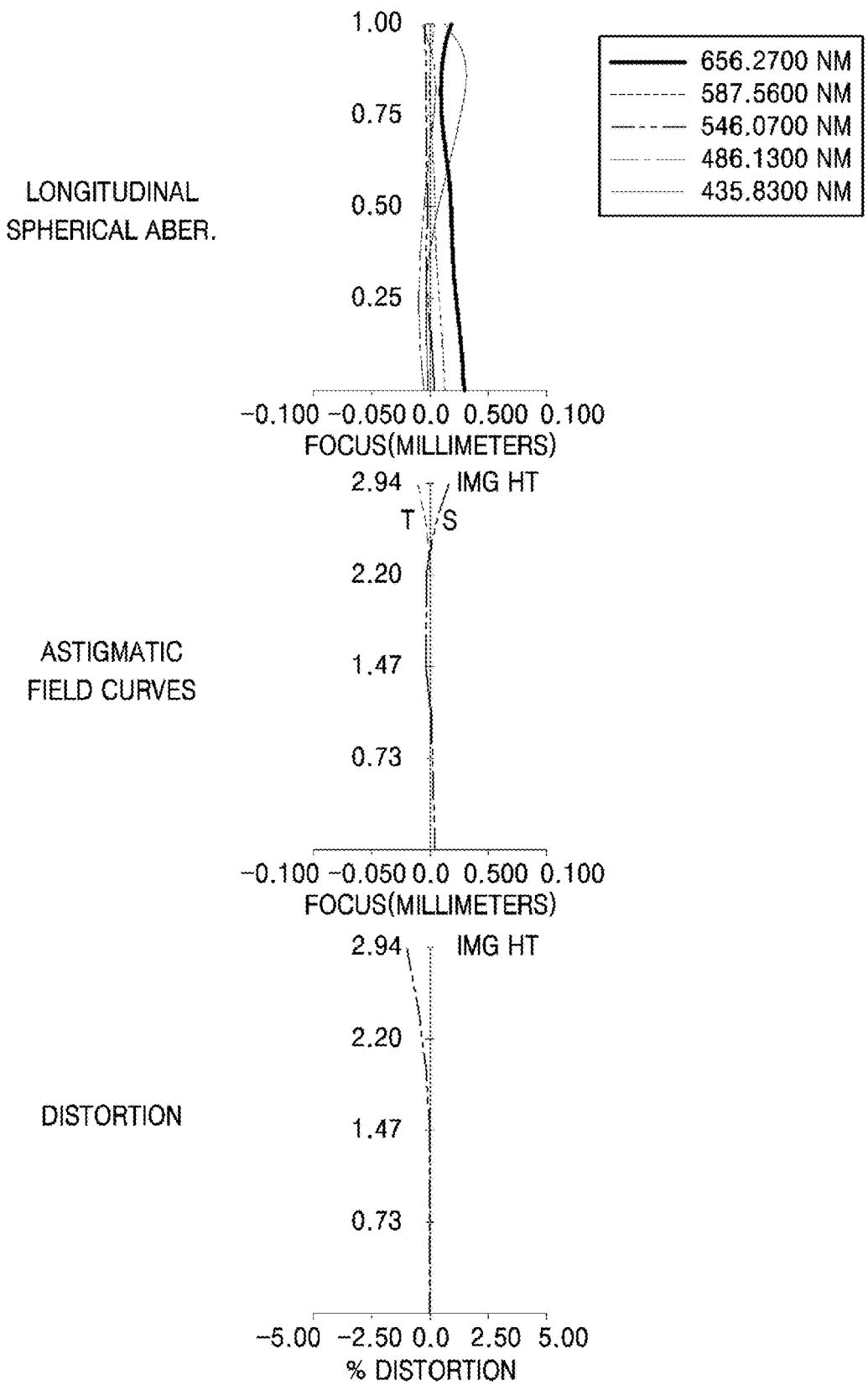
FIG. 5 is a diagram showing the aberration characteristics of the optical system according to the first embodiment of the present disclosure.

FIG. 5 is a diagram showing the aberration characteristics of the optical system according to the first embodiment of the present disclosure. Longitudinal spherical aberration, astigmatic field curves, and distortion are shown in order of appearance from left to right.

In FIG. 5, the Y-axis represents the size of the image, and the X-axes represent the focal length (in mm) and distortion (in %). As the curves approach the Y-axis, the aberration correction function is interpreted as good. As shown in FIG. 5, the longitudinal spherical aberrations located within the measure of 0.05 mm, astigmatic field curves are within 0.025 mm, and the distortion is located within 1%, those are exhibiting excellent aberration characteristics. Therefore, by optimizing and arranging the lenses of the high heat resistant material as in the first embodiment, the present disclosure can obtain aberration characteristics equivalent to a camera that does not use the high heat resistant material.

Figure 6:
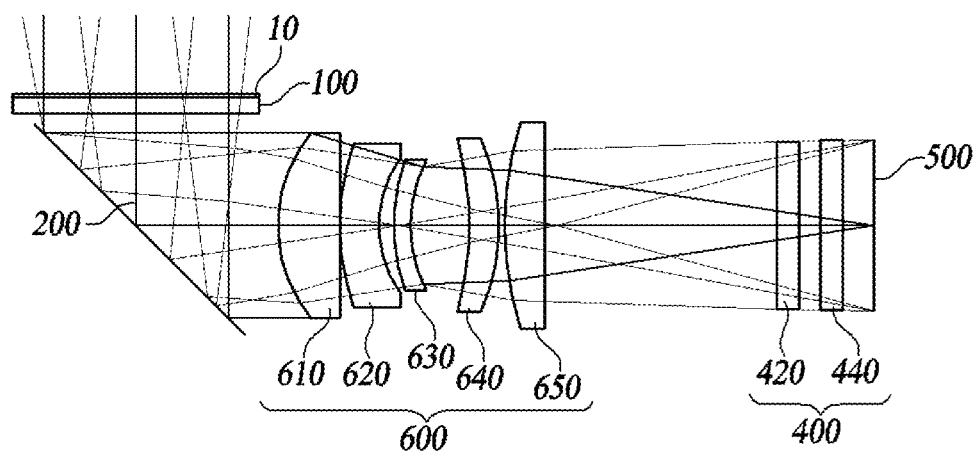
FIG. 6 is a diagram of an optical system of a vehicle camera according to a second embodiment of the present disclosure.

FIG. 6 is a diagram of an optical system of a vehicle camera according to a second embodiment of the present disclosure.

As shown in FIG. 6, a vehicle camera according to the second embodiment of the present disclosure includes all or some of a water-repellent coating layer 10, a lens cover 100, a reflective member 200, a lens group 600, an optical filter group 400, and an image surface 500. The vehicle camera according to the second embodiment is different in characteristics of the lens group 600 from the vehicle camera according to the first embodiment.

The lens group 600 includes five lenses disposed along the optical axis, which are a first lens 610, a second lens 620, a third lens 630, a fourth lens 640, and a fifth lens 650 arranged in order of appearance and order of closeness to the object side. Further, the plurality of lenses may be arranged spaced apart from each other by predetermined distances along the optical axis.

The following is a description of the lens group 600 included in the vehicle camera according to the second embodiment.

The first lens 610 may have a positive refractive power and one surface that is convex, for example, on an object-side surface thereof. In this case, the first lens 610 may have an image-side surface that is a concave meniscus shape. Further, at least one of the object-side surface and the image-side surface of the first lens 610 may be an aspherical surface.

The second lens 620 may have a negative refractive power and one surface that is convex, for example, on an object-side surface thereof. In this case, the second lens 620 may have an image-side surface that is a concave meniscus shape. In addition, at least one of the object-side surface and the image-side surface of the second lens 620 may be an aspherical surface.

The third lens 630 may have a negative refractive power and one surface that is convex, for example, on an object-side surface thereof. In this case, the third lens 630 may have an image-side surface that is a concave meniscus shape. In addition, at least one of the object-side surface and the image-side surface of the third lens 630 may be an aspherical surface.

The fourth lens 640 may have a positive refractive power and one surface that is concave, for example, on an object-side surface thereof. In this case, the fourth lens 640 may have an image-side surface that is a convex meniscus shape. Further, at least one of the object-side surface and the image-side surface of the fourth lens 640 may be an aspherical surface.

The fifth lens 650 may have a negative refractive power and one surface that is concave, for example, on an object-side surface thereof. In this case, the fifth lens 650 may have an image-side surface that is a convex meniscus shape. In addition, at least one of the object-side surface and the image-side surface of the fifth lens 650 may be an aspherical surface.

The first lens 610 to the fifth lens 650 are preferably plastic lenses excellent in heat resistance so as not to be damaged by heat generated due to the continuous use of the camera, wherein the glass transition temperature of the respective lenses may be 140° C. or higher. However, they are not necessarily configured using lenses made of plastic, and as long as the glass transition temperature can be 140° C. or higher, lenses of other materials may also be employed.

In addition, the lens of high heat resistant material having a glass transition temperature of 152° C. or higher generally has a low refractive index, so an optical system composed only of lenses of high heat resistant material has poor aberration performance. Therefore, lenses of high heat resistant material are preferably arranged in a manner that does not degrade the aberration performance of the optical system.

Accordingly, to obtain performance equivalent to the aberration performance of a prevalent optical system, the first lens 610 may be the one that uses a high heat resistant material to have a glass transition temperature of 152° C. or higher. The third lens 330 and the fifth lens 650 may also be the ones that use a high heat resistant material to have a glass transition temperature of 152° C. or higher.

FIG. 7 is a table showing characteristics of the respective lenses illustrated in FIG. 6.

FIG. 8 is a table showing aspheric coefficients of the respective lenses shown in FIG. 6.

In FIGS. 7 and 8, the values for the radius of curvature, thickness, focal length, etc. of the lenses are all in mm, and the unit of glass transition temperature is ° C.

FIGS. 7 and 8 specify the curvature radius, thickness, focal length, index of refraction, Abbe number, glass transition temperature, and asphericity of the reflective member 200, the lens group 600, the IR filter 420, and the cover glass 440 according to the second embodiment.

The focal length (f) of the entire optical system according to the second embodiment is 12 mm, and the focal length (f1) of the first lens 610 is 5.9241 mm. Therefore, the entire optical system according to the second embodiment can satisfy conditional expression 1 and conditional expression 2.

Meanwhile, the lens group 600 according to the second embodiment may include at least one or more plastic lenses. In this case, at least one or more of the lenses included in the lens group 600 according to the second embodiment can satisfy conditional expression 3, and at least one or more plastic lenses among the lenses included in the lens group 600 according to the second embodiment can satisfy conditional expression 4.

Figure 9:
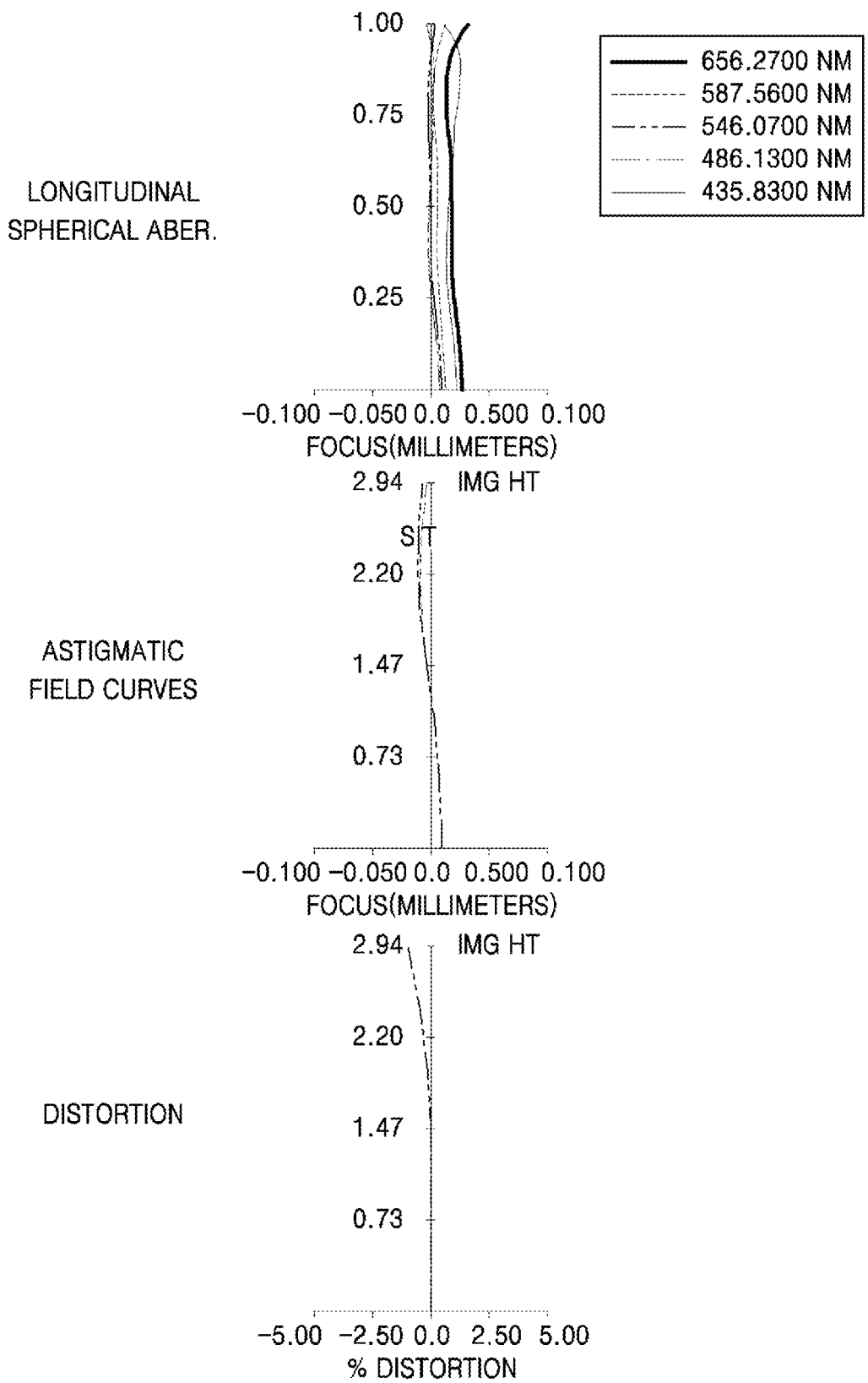
FIG. 9 is a diagram showing the aberration characteristics of the optical system according to the second embodiment of the present disclosure.

FIG. 9 is a diagram showing the aberration characteristics of the optical system according to the second embodiment of the present disclosure. Longitudinal spherical aberration, astigmatic field curves, and distortion are shown in order of appearance from left to right.

In FIG. 9, the Y-axis represents the size of the image, and the X-axes represent the focal length (in mm) and distortion (in %). As the curves approach the Y-axis, the aberration correction function is interpreted as good. As shown in FIG. 9, the longitudinal spherical aberrations located within the measure of 0.05 mm, astigmatic field curves are within 0.025 mm, and the distortion is located within 1%, those are exhibiting excellent aberration characteristics. Therefore, by optimizing and arranging the lenses of the high heat resistant material as in the second embodiment, the present disclosure can obtain aberration characteristics equivalent to a camera that does not use the high heat resistant material.

Figure 10:
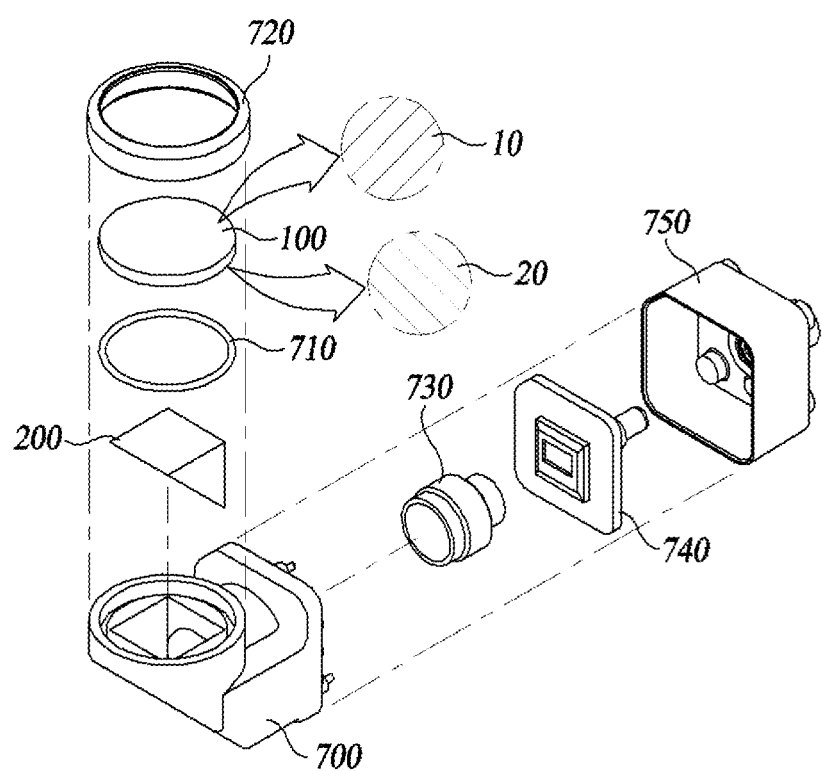
FIG. 10 is a diagram of a configuration of a vehicle camera according to at least one embodiment of the present disclosure.

FIG. 10 is a diagram of a configuration of a vehicle camera according to at least one embodiment of the present disclosure.

Figure 11:
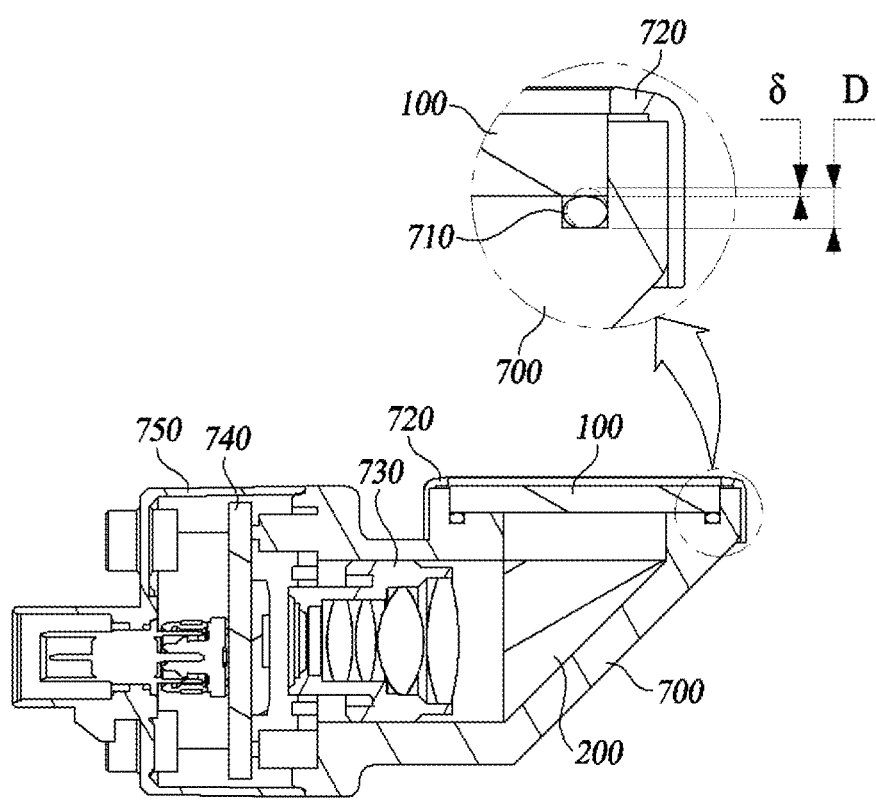
FIG. 11 is a cross-sectional view of a vehicle camera and illustrates a waterproof member compressed according to at least one embodiment of the present disclosure.

FIG. 11 is a cross-sectional view of a vehicle camera and illustrates a waterproof member compressed according to at least one embodiment of the present disclosure.

As shown in FIGS. 10 and 11, the vehicle camera according to at least one embodiment of the present disclosure includes all or some of a front body 700, a waterproof member 710, a retainer 720, a lens barrel 730, a printed circuit board (PCB) 740, and a rear body 750.

The front body 700 is configured to include the first half of the optical system to protect the reflective member 200 and the lens group 300 or 600. The object-side surface of the front body 700 is formed with a groove for allowing the waterproof member 710 to be disposed, and the object-side surface has a rim stepped, conforming to the circumference of the lens cover 100.

The waterproof member 710 is disposed in the groove formed in the front body 700, the lens cover 100 is disposed on the upper portion of the waterproof member 710 to apply pressure to the waterproof member 710. The waterproof member 710 may be an O-ring or a gasket.

The retainer 720 is located on the top of the lens cover 100 and is coupled to the front body 700 to firmly attach the lens cover 100, the waterproof member 710, and the front body 700 to each other. Therefore, the retainer 720 has an effect of increasing the compression ratio of the waterproof member 710.

On the other hand, when D denotes the thickness of the waterproof member 710 is D, δ denotes the depressed amount of the waterproof member 710 when depressed, and K denotes the compression ratio of the waterproof member 710, K is calculated by Equation 2.

$$K = \left(\frac{\delta}{D}\right) \times 100 \qquad \text{Equation 2}$$

The waterproof member 710 of the vehicle camera according to at least one embodiment of the present disclosure may satisfy a conditional expression 5, thereby realizing the IPX9K level of waterproof performance.

$$10\% < K < 30\% \qquad \text{[Conditional Expression 1]}$$

The lens barrel 730 is configured as a plurality of cylinders combined to include the lens group 300 or 600. The lens barrel 730 protects the lens group 300 or 600 from external impact and prevents the lens arrangement from being changed.

The front surface of the PCB 740 is attached to the rear surface of the image surface 500, and it allows the image surface 500 to be fixed at a specific location. The rear surface of the PCB 740 is coupled to the rear body 750.

The rear body 750 is configured to include the second half of the optical system to protect the PCB 740 and the image surface 500. The front edge of the rear body 750 is formed to fit around and engage with the PCB 740.

FIG. 12 is a table showing the optical characteristics of the vehicle cameras according to the first and second embodiments of the present disclosure.

FIG. 12 illustrates that the optical systems of the vehicle cameras according to the first and second embodiments satisfy conditional expressions 1 to 5.

On the other hand, a vehicle camera according to at least one embodiment of the present disclosure may be mounted on one or more of the front side, a rear side, an A-pillar, a B-pillar, a side mirror and an electronic mirror (e-mirror) of the vehicle. Here, the e-mirror refers to one that is formed where a vehicle's room mirror or the like is located, and it may function as a mirror or a display panel depending on situations.

A vehicle camera according to at least one embodiment of the present disclosure is a refractive type camera that has a short length with lenses disposed after the prism, thereby enabling to take a picture from a buried camera mount unnoticed. In other words, the present vehicle camera may be mounted such that only the cover glass is visible in a small form, such as the front camera of a mobile phone. In addition, when a vehicle is already installed with a protruding camera using a wide-angle lens or the like, the present vehicle camera may cooperate with the protruding camera to widen the field of view and detection range of the entire camera system.

As described above, the present disclosure can solve the difficulty of mounting on a vehicle the telephoto lens due to an otherwise long length thereof by configuring the camera in an angled arrangement.

In addition, the use of lenses of a high heat resistant material can provide uninterrupted camera performance even with a constant heat applied to the camera due to a system such as a Drive Video Record System (DVRS). The use of a plastic as a high heat resistant material in providing a plastic lens with a low refractive index has typically deteriorated the aberration characteristics of the optical system compared to a system of a camera using other materials than the high heat resistant material. However, the optimized layout and design of lenses as the at least one embodiment of the present disclosure can provide the vehicle camera with the aberration characteristics comparable to a camera using other materials than the high heat resistant material. In addition, the present disclosure meets the outstanding need to prepare for bad weather conditions natural to the vehicle camera mounted on the outside of the vehicle by applying a water-repellent coating and a waterproof structure to the camera, which can prevent rainwater or elements from lowering the visibility of the camera.

As described above, the present disclosure in at least one embodiment can provide a vehicle camera miniaturized by reducing the length of the telephoto lens and provide desired optical performance through the optimized design of lenses while using a high heat resistant material.

In addition, with a water-repellent coating and a waterproof structure applied to an externally mounted vehicle camera, the present disclosure enables the camera to perform without interruption by rainwater or elements.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A vehicle camera, comprising:
    a water-repellent coating layer configured to allow a contact angle of water droplets to be formed at at least a predetermined angle;
    a reflective member having a reflective surface configured to change a direction of an optical axis of the vehicle camera;
    a lens group including at least one or more lenses that have high heat resistance and a glass transition temperature of 140° C. or higher; and
    an optical filter group including at least one or more optical filters,
    wherein the water-repellent coating layer, the reflective member, the lens group, and the optical filter group are arranged in order of appearance from an object side along the optical axis, and
    wherein the optical axis of the vehicle camera extends through the water-repellent coating layer, the reflective member, the lens group, and the optical filter group.

2. The vehicle camera of claim 1, wherein the water-repellent coating layer is configured to allow at least 100° of contact angle of water droplets to be formed.

3. The vehicle camera of claim 1, wherein the water-repellent coating layer is formed by a coating process performed on an object-side surface of the reflective member.

4. The vehicle camera of claim 1, wherein
    at least one or more of the lenses included in the lens group have a glass transition temperature of 152° C. or higher,
    the lens group includes at least one or more plastic lenses, and
    at least one or more of the plastic lenses satisfy $1.51<P(nd)<1.54$ where $P(nd)$ represents an index of refraction of the plastic lenses.

5. A vehicle equipped with the vehicle camera of claim 1, which is mounted on one or more of a front side, a rear side, an A-pillar, a B-pillar, a side mirror, and an electronic mirror (e-mirror) of the vehicle.

6. A vehicle camera comprising:
    a water-repellent coating layer configured to allow a contact angle of water droplets to be formed at at least a predetermined angle;
    a reflective member having a reflective surface configured to change an optical path;
    a lens group including at least one or more lenses that have high heat resistance and a glass transition temperature of 140° C. or higher; and
    an optical filter group including at least one or more optical filters, wherein the water-repellent coating layer, the reflective member, the lens group, and the optical filter group are arranged in order of appearance from an object side along an optical axis,
    wherein the lens group comprises a lens that is disposed closest to the reflective member, has a positive refractive power, has an object-side surface that is convex, and has a glass transition temperature of 152° C. or higher.

7. The vehicle camera of claim 6, wherein $1.0<TTL/BFL<3.5$
    where TTL represents a total track length that is a distance to an image surface of the vehicle camera from the object-side surface of the lens that is disposed closest to the reflective member among the lenses of the lens group, and BFL represents a back focal length that is a distance to the image surface from an image-side surface of a lens that is disposed closest to the image surface among the lenses of the lens group.

8. The vehicle camera of claim 7, wherein $1.5 < f/f1 < 3.5$ where f represents a total focal length of an optical system composed of the lens group, and
f1 represents a focal length of the lens that is disposed closest to the reflective member.

9. The vehicle camera of claim 8, wherein the lens group comprises:
a first lens having positive refractive power;
a second lens having negative refractive power; a third lens having negative refractive power;
a fourth lens having positive refractive power; and a fifth lens having negative refractive power,
wherein the first lens, the second lens, the third lens, the fourth lens, and the fifth lens are arranged in order of appearance from the object side along the optical axis.

10. The vehicle camera of claim 9, wherein the first lens and the third lens have a glass transition temperature of 152° C. or higher.

11. The vehicle camera of claim 8, wherein the lens group comprises:
a first lens having positive refractive power;
a second lens having negative refractive power; a third lens having negative refractive power;
a fourth lens having positive refractive power; and a fifth lens having positive refractive power,
wherein the first lens, the second lens, the third lens, the fourth lens, and the fifth lens are arranged in order of appearance from the object side along the optical axis.

12. The vehicle camera of claim 11, wherein the first lens, the third lens, and the fifth lens have a glass transition temperature of 152° C. or higher.

13. A vehicle camera comprising:
a water-repellent coating layer configured to allow a contact angle of water droplets to be formed at at least a predetermined angle;
a reflective member having a reflective surface configured to change an optical path;
a lens group including at least one or more lenses that have high heat resistance and a glass transition temperature of 140° C. or higher; and
an optical filter group including at least one or more optical filters, wherein the water-repellent coating layer, the reflective member, the lens group, and the optical filter group are arranged in order of appearance from an object side along an optical axis; and
a lens cover disposed between the water-repellent coating layer and the reflective member to protect the reflective member,
wherein the water-repellent coating layer is formed by a coating process performed on a front surface of the lens cover.

14. The vehicle camera of claim 13, wherein the lens cover has a rear surface on which an infrared coating layer is formed.

15. The vehicle camera of claim 13, wherein the optical filter group comprises:
an infrared (IR) filter, and
a coverglass configured to protect an image surface of the vehicle camera,
the IR filter and the coverglass being arranged in order of appearance from the object side.

16. The vehicle camera of claim 13, comprising:
a front body configured to include the reflective member and the lens group, and having an object-side surface on which a groove is formed; and
a waterproof member that is disposed between the lens cover and the groove of the front body.

17. The vehicle camera of claim 16, wherein the waterproof member is an O-ring or gasket, and
$10\% < K < 30\%$ where K represents a compression ratio of the O-ring or gasket.

* * * * *